United States Patent
Boniolo et al.

(10) Patent No.: US 11,166,071 B2
(45) Date of Patent: Nov. 2, 2021

(54) SYSTEM FOR ACKNOWLEDGING A USER AMONG A PLURALITY OF USERS IN AN ENVIRONMENT

(71) Applicant: E-NOVIA S.P.A., Milan (IT)

(72) Inventors: Ivo Boniolo, Bovisio Masciago (IT); Vincenzo Costanzo Russi, Milan (IT); Alex Buzzetti, Soragna (IT); Niccolò Valerio, Milan (IT)

(73) Assignee: E-Novia S.p.A., Milan (IT)

( * ) Notice: Subject to any disclaimer, the term of this patent is extended or adjusted under 35 U.S.C. 154(b) by 0 days.

(21) Appl. No.: 16/491,179

(22) PCT Filed: Feb. 19, 2018

(86) PCT No.: PCT/IB2018/051009
§ 371 (c)(1),
(2) Date: Sep. 5, 2019

(87) PCT Pub. No.: WO2018/185568
PCT Pub. Date: Oct. 11, 2018

(65) Prior Publication Data
US 2020/0037028 A1 Jan. 30, 2020

(30) Foreign Application Priority Data
Apr. 7, 2017 (IT) .......................... 102017000038880

(51) Int. Cl.
*H04N 21/442* (2011.01)
*H04H 60/45* (2008.01)
(Continued)

(52) U.S. Cl.
CPC ...... *H04N 21/44218* (2013.01); *H04H 60/45* (2013.01); *H04H 60/46* (2013.01);
(Continued)

(58) Field of Classification Search
None
See application file for complete search history.

(56) References Cited

U.S. PATENT DOCUMENTS

| 5,777,571 A * | 7/1998 | Chuang | ................... G10L 17/00 |
| | | | 341/176 |
| 2002/0059588 A1 * | 5/2002 | Huber | .................. H04N 21/454 |
| | | | 725/35 |

(Continued)

OTHER PUBLICATIONS

International Search Report & Written Opinion in PCT/IB2018/051009 dated May 15, 2018.

*Primary Examiner* — Alexander Q Huerta
(74) *Attorney, Agent, or Firm* — Manelli Selter PLLC; Edward Stemberger

(57) ABSTRACT

A system (1) for acknowledging a user among a plurality of users in an environment, includes:
a movable device (2) configured to be by users in the environment, configured to command a stationary device (3), wherein movable device (2) comprises:
one or more motion sensors (13) to detect movements imparted by the user to the movable device (2) and to provide signals representative of the same;
a microphone (15) to detect the sound of the environment and to provide a signal representative of the same;
a motion acknowledging module (16);
a vocal acknowledging module (17); and
a pairing module (20).

12 Claims, 2 Drawing Sheets

(51) Int. Cl.
*H04H 60/46* (2008.01)
*H04N 21/422* (2011.01)
*H04N 21/439* (2011.01)
*H04N 21/45* (2011.01)

(52) U.S. Cl.
CPC ..... *H04N 21/42203* (2013.01); *H04N 21/439* (2013.01); *H04N 21/4532* (2013.01)

(56) References Cited

U.S. PATENT DOCUMENTS

| | | | | |
|---|---|---|---|---|
| 2003/0005462 | A1* | 1/2003 | Broadus | H04N 21/439 725/110 |
| 2009/0030940 | A1* | 1/2009 | Brezina | H04L 67/306 |
| 2009/0138805 | A1* | 5/2009 | Hildreth | H04N 21/64322 715/745 |
| 2009/0138907 | A1* | 5/2009 | Wiser | H04N 21/812 725/34 |
| 2011/0069940 | A1* | 3/2011 | Shimy | H04N 21/44218 386/296 |
| 2012/0019400 | A1* | 1/2012 | Patel | H04N 5/4403 340/870.15 |
| 2013/0035086 | A1* | 2/2013 | Chardon | H04N 21/4826 455/420 |
| 2013/0304789 | A1* | 11/2013 | Herlein | H04L 67/10 709/201 |
| 2014/0028920 | A1* | 1/2014 | Wang | H04N 21/422 348/734 |
| 2014/0282807 | A1* | 9/2014 | Joseph | H04L 65/4076 725/132 |
| 2015/0205622 | A1* | 7/2015 | DiVincent | G06F 9/4451 713/100 |
| 2015/0288687 | A1 | 10/2015 | Heshmati et al. | |
| 2015/0382048 | A1* | 12/2015 | Fan | H04N 21/41265 725/27 |
| 2016/0253594 | A1* | 9/2016 | Chowdhary | H04W 4/38 706/52 |
| 2018/0063582 | A1* | 3/2018 | Cummins | H04N 21/44218 |
| 2018/0096696 | A1* | 4/2018 | Mixter | G10L 25/51 |

\* cited by examiner

SYSTEM FOR ACKNOWLEDGING A USER AMONG A PLURALITY OF USERS IN AN ENVIRONMENT

TECHNICAL FIELD OF THE INVENTION

The present invention refers to a system for acknowledging a user among a plurality of users in an environment and also the number of users present in this environment.

PRIOR ART

The development of interactive systems, such as smart TVs and the associated applications for enjoying contents dedicated to a particular user, requires these systems to be capable of acknowledging the user employing them in order to supply customized services and contents. With reference to smart TVs, acknowledging a user enables, for example, to suggest contents (movies or TV series) satisfying his/her tastes. Usually, the known systems identify the user by a user name. Therefore, a profile is made of each user by means of a contents enjoying pattern, by which contents suggesting systems are created by means of clustering algorithms.

These systems sometimes enable, in addition, for a same user name, to create sub-groups of users with the same user name, in order to be capable of providing suggestions aimed to each sub-user.

Unfortunately, such known systems create a "user profile" and consequently provide suggestions, based on information supplied by the user himself/herself. For example, such systems are not capable of distinguishing if a user (a host or a family member, for example) different from the owner of the user name, is using the system, and therefore, once this case is true, there is the risk of gathering information altering the user profile, which consequently could provide suggestions unsuitable to his/her taste.

BRIEF SUMMARY OF THE INVENTION

Therefore, the problem underlying the present invention consists of making available a system for acknowledging a user among a plurality of users, which does not create profiles based only on entries made by the user himself/herself and therefore is capable of making profiles of several persons, by distinguishing the habitual users from the temporary users, and consequently enables to provide a reliable suggestion of contents adapted to the specific identified user.

This and other objects are met by a system for acknowledging a user among a plurality of users according to claim 1.

The dependent claims define possible advantageous embodiments of the invention.

BRIEF DESCRIPTION OF THE DRAWINGS

For a better comprehension of the invention and appreciating the advantages thereof, in the following will be described some exemplifying non-restrictive embodiments thereof with reference to the attached figures, wherein.

DESCRIPTION OF THE EMBODIMENTS OF THE INVENTION

Figure 1:
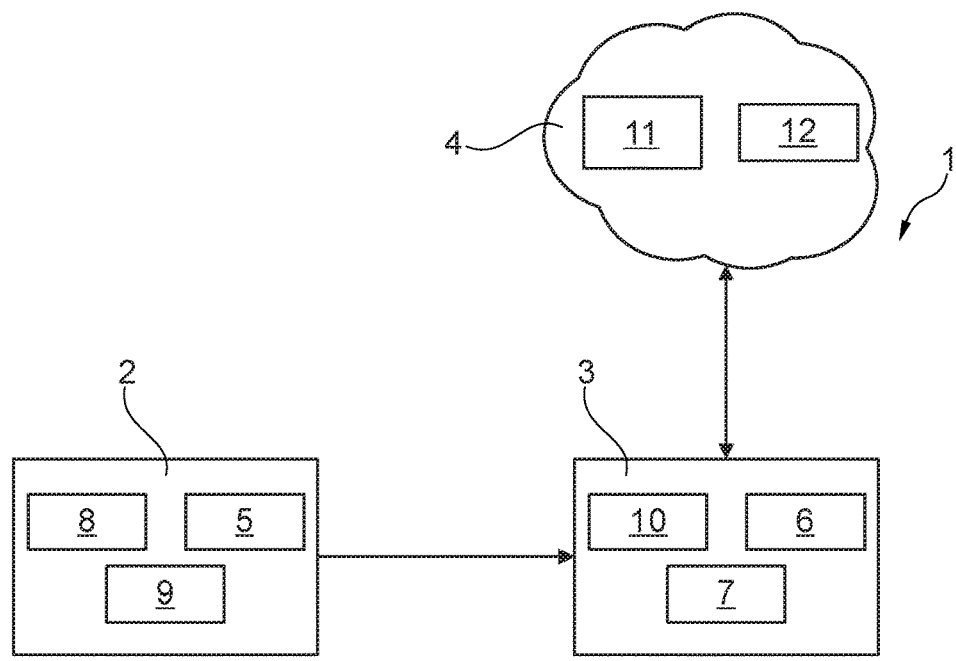
FIG. 1 is a schematic illustration of a system for acknowledging a user among a plurality of users according to a possible embodiment.

With reference to the attached FIG. 1, a system for acknowledging a user among a plurality of users is generally indicated by the reference number 1.

The system 1 comprises a movable device 2, a stationary device 3 and a remote processing system 4. The device 2 is a device portable and handleable by the users, for example a remote control. The stationary device 3 is a device connected to the movable device 2 and capable of interacting with it, particularly capable of being commanded by this latter. For example, the stationary device 3 can be a decoder to be connected to or included in a TV, or can be a TV configured as a smart TV, capable of providing multimedia contents based on the needs of the user, entered by the remote control. The remote processing system 4 can be, for example, a remote server, capable of storing data provided by the stationary device 3, of processing them, and of providing the results of such processing to the stationary device 3. The movable device 2 can communicate with the stationary device 3, for example, by an infrared protocol, or by a wireless short-distance protocol, such as a Bluetooth® protocol, or by a Wi-Fi network common to the stationary device 3. For this reason, the movable device 2 and stationary device 3 are respectively provided with corresponding communication modules 5 and 6. In turn, the stationary device 3 can communicate with the remote processing system 4, for example, by an Internet network, and for this purpose, is advantageously provided with an Internet connection module 7. According to a possible further variant, the movable device 2 is configured to directly communicate with the remote processing system 4. For example, the movable device 2 can be connectable to a domestic network, by which it communicates with the remote processing system 4.

As it will be specifically described in the following, the movable device 2 comprises a plurality of sensors 8 used for identifying a user handling the movable device 2 and, more generally, the users present in the environment, wherein the movable device 2 and stationary device 3 are located. The stationary device 3, as it will be described, can be also provided with further sensors which can be used for the same purpose. The movable device 2, stationary device 3 and remote processing system 4 comprise corresponding control units 9, 10, 11. As a function of the signals from the sensors 5 of the movable device 2 and possibly of the stationary device 3, the system 1 is capable of acknowledging a user among a plurality of users by ways described in the following. Processing the signals from the sensors, can be alternatively performed in the control units 2, or 3, or 4 or, alternatively, can be shared among them. Preferably, processing the signals of the sensors is performed in the remote processing system 4 because of the computational load. The processed data are stored in a memory module 12, preferably also available in the remote processing system 4, which, as an alternative, can be located in the movable device 2 or stationary device 3.

The following description will refer, merely in an exemplifying way for a better comprehension, to a remote control 2 and a decoder of a TV 3.

Figure 2:
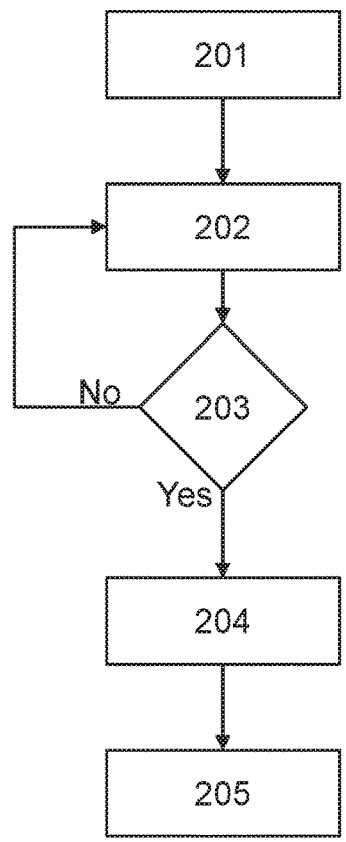
FIG. 2 is a block diagram illustrating a possible operation of the system according to an embodiment of the invention.

FIG. 2 shows a block diagram of the main operative steps of the system 1 according to a possible embodiment, with reference to an exemplifying case of a remote control and decoder. According to such block diagram, the performed steps are the following:

- 201: turning on the decoder/TV 3 and also, if necessary, the remote control 2;
- 202: detecting by the sensors of the remote control/decoder, the parameter identifying the specific user handling the remote control, and also the users present in the environment;
- 203: comparing the signals from the sensors with previously stored data. If the comparison between the currently detected data and the previously detected ones does not enable to identify a user, the block diagram returns to the step 202. Such condition is verified the first times the system is used in an environment, when few previous detections or no detection are available, or when in the environment, there is a new user/temporary user which was never previously detected, or when there is a user of which few detected information are available;
- 204: on the contrary if the data detected in the block 202 are sufficient, identifying the user;
- 205: providing multimedia contents specifically destined to a specific determined user. For example, for a TV, to a user can be suggested movies or TV series, meeting his/her tastes, or advertisement contents according to the profile of the identified user.

Figure 3:
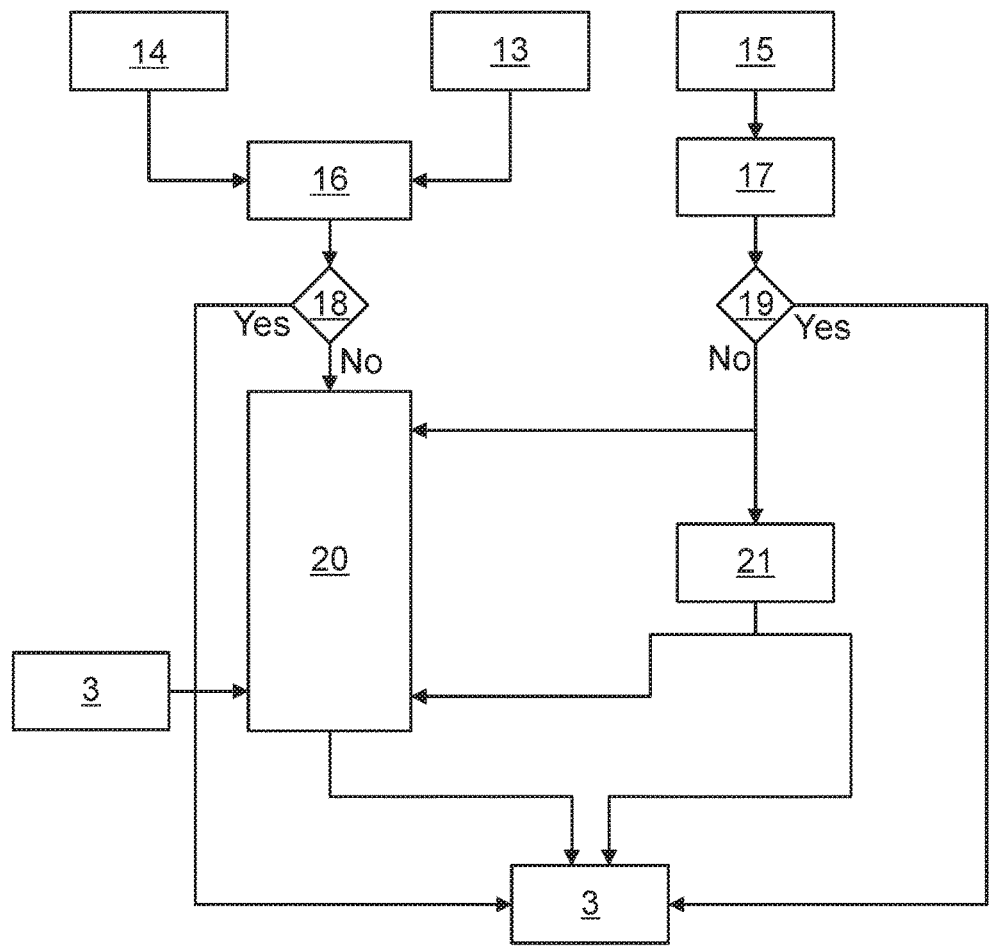
FIG. 3 is a detailed block diagram illustrating a possible operation of the system according to an embodiment of the invention.

With reference to the block diagram shown in FIG. 3, now a possible operation of the system 1 will be described according to the invention.

The remote control 2 comprises at least one or more motion sensors 13, for example one or more inertial sensors (for example accelerometers and/or gyroscopes and/or magnetometers), configured to detect the movements imparted by the user handling the remote control, to the remote control itself, and suitable for generating signals indicative of the same. According to a possible embodiment, moreover the remote control 2 comprises one or more pressure sensors 14 adapted to detect some pressures exerted by the user handling the remote control, on portions of it, for example on the buttons thereof or on a touchpad thereof, if present, or pressure sensors specifically provided on the handle of the remote control.

Moreover, the remote control 2 comprises a microphone 15 adapted to detect sounds present in the environment wherein the remote control 2 itself is placed, particularly the voices of the present users: not only of the user handling the remote control, but also of other possible users present in the environment which do not handle the remote control, but which can enjoy the multimedia contents provided by the decoder 3. The microphone 15 provides, at the output, a signal representative of the sound detected in this environment. Preferably, the microphone 15 is left in a stand-by condition until it detects a sound.

According to further not illustrated embodiments, it is observed that the remote control can comprise further sensors. For example, the remote control can comprise a Wi-Fi module to be connected to the Wi-Fi network of the environment, if provided, in order to detect possible movable portable devices, such as smartphones of users connected to the same network and which therefore provide a further indication of the users present in the environment. As an alternative or in addition, the remote control 2 can comprise a Bluetooth® module adapted to detect the presence of said smartphones, if these have in turn an active Bluetooth® module. The presence of a smartphone is, just per se, indicative of the presence of a specific user. The Wi-Fi and Bluetooth® modules can be further used for detecting the position of the remote control 2 in the environment.

Moreover, the system 1 comprises a motion acknowledging module 16 and a vocal acknowledging module 17. Based on what was previously discussed, such modules 16 and 17 can be part of the control modules of the remote control 2 and/or decoder 3 and/or remote processing system, in other words they are not necessarily part of the movable device 2 but can be outside and connected to it.

With reference to the gesture acknowledging module 16, it receives, at the input, signals representative of motions imparted to the remote control provided by the motion sensors 13, and signals representative of the pressures provided by the pressure sensors 14, and is configured to identify, in each of them, significant parameters of the signal, which in turn can be used for identifying the user or users present in the environment. For example, with reference to the inertial signals, they can comprise characteristic frequencies in one or more directions representing the way a user handles the remote control. Generally, a nervous user could swing the remote control at a high frequency because, for example, vividly gestures while speaking, or could violently place it on a plane when stops using it. Viceversa, a generally quite user could stably hold the remote control in a substantially stationary position, consequently the accelerations/rotations along some axes will be approximately absent, while along other directions, the accelerations/rotations will have a low strength and frequency. Analogously, a generally nervous user could frequently zap, therefore he/she will continuously press the control buttons, perhaps by exerting high pressures, while a generally quiet user will press the same less frequently and less vigorously.

With reference to the vocal acknowledging module 17, it receives, at the input, the signal representative of the sounds in the environment, provided by the microphone and is configured to extract from each of them significant parameters of the signal itself, which in turn can be used for identifying the user/s present in the environment. For example, the vocal acknowledging module 17 can be configured to execute a frequency analysis of the signals by which can be obtained information regarding the sex and/or age of the present users (indeed, male, female, young and less young voices have generally acknowledgeable frequency ranges). Moreover, the sound analysis enables to obtain information about people which are not directly actuating the remote control. For example, generally it is assumed that the highest sounds are generated by the user handling the remote control 2, nearest to the microphone 15, while it is assumed that less high sounds are generated by other users present in the environment, distanced from the remote control.

Preferably, both the gesture acknowledging module 16 and vocal acknowledging module 17 are configured to pre-process respective signals at the input. Particularly, both the modules 16 and 17 are preferably configured to filter the signals in order to filter out instrumental/environment noises present in it. Such noise can include interferences, noises belonging to the sensors or, with reference to the microphone 15, background noises always present in any environment.

With reference to the vocal acknowledging module 17, particularly it is advantageously configured to filter, out from the signal of the microphone 15, the sound portion due to the stationary device 3. For example, in case of a TV, during the transmission of a television program, the sounds from it, entering the environment and therefore detected by the microphone 15, must be filtered out since they are not relevant for acknowledging the users present in the environment.

According to an embodiment, the system comprises a gesture identifying module 18 receiving, at the input, the significant parameters of the motion and pressure signals determined by the gesture acknowledging module 16, and a sound identifying module 19 receiving, at the input, the significant parameters of the sound signal, determined by the sound acknowledging module 19. Each modules 18 and 19 compare corresponding significant parameters, at the input, with significant parameters stored in a memory module, for example in the beforehand cited memory module 12, associated to a particular user. If a significant parameter, or a combination of significant parameters, is identified by the gesture identifying module 18 or vocal identifying module 19, as corresponding to a significant parameter/combination of stored significant parameters associated to a specific user, then the user is identified. Therefore, only one of the gesture identifying module 18 and sound identifying module 19 is sufficient for the identification. Clearly, storing significant parameters identifying a user assumes the system has already performed a sufficient number of samplings and therefore it is possible a comparison between the detected significant parameters and the stored significant parameters. Without stored significant parameters or with an insufficient number thereof, or without a match between the detected significant parameters and the stored ones identifying a user, the user is not identified.

Therefore, the system comprises a pairing module 20 detecting, during following detecting periods or instants, the significant parameters of the motion and pressure signals and of sound signals when the gesture identifying module 18 or sound identifying module 19 has not already identified the user. Further, the pairing module 20 is configured to distinguish groups of significant parameters which are recurringly correlated in a plurality of detection periods or instants and to attribute each identifying parameter of the same group to a specific user.

The groups of significant recurringly correlated parameters attributed to a specific user can be stored in the memory module 12 and therefore are made available to the gesture identifying and sound identifying modules 18, 19. So, when the system is used, the gestures acknowledging module 16 or sound acknowledging module 17 must only detect just the significant parameters attributed by the cited modes to a specific user, and previously stored in the memory module 12, so that the gesture identifying module 18 or sound identifying module 19, based also on a single significant parameter, are capable of acknowledging the user among a plurality of users.

Figure 4:
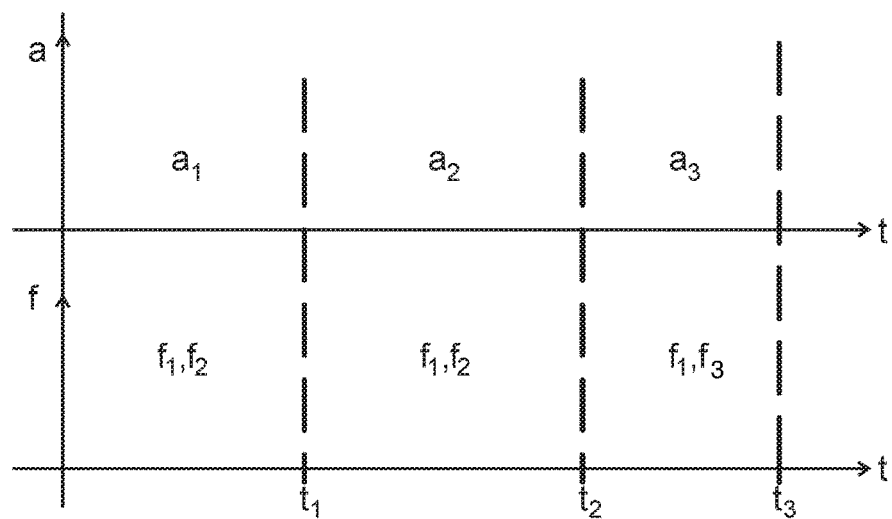
FIG. 4 shows an exemplifying diagram describing how a user is acknowledged by a system according to the invention.

For a better comprehension of the operation of the pairing module 20, it is considered a highly simplified example of FIG. 4. According to this example, the pairing module 20 receives, at the input, significant parameters of an acceleration a (the frequency of the acceleration along a determined axis, for example) detected on the remote control and the significant parameters of the sound signal f (for example, the frequency spectra each indicating a specific user present in the environment) during three distinct detection periods t1, t2, t3. Particularly:

during the first detecting period t1, the acceleration significant parameter a1 and sound significant parameters f1, f2, indicating the presence of two persons in the environment, are detected. Therefore, it can be logically assumed that the acceleration a1 belongs to one of the persons having the vocal significant parameter f1 or f2;

during the second sampling period t2, the acceleration significant parameter a2 (different from a1) and the same sound significant parameters f1, f2 are detected. Therefore, it can be logically assumed that the acceleration a2 belongs to one of the two persons having the vocal significant parameter f1 or f2, already detected during the sampling period t1;

during the third sampling period t3, the acceleration significant parameter a1, and the sound significant parameters f1 and f3 are detected again, wherein f3 was never detected before, while f1 was already detected during the periods t1 and t2. Therefore, it can be logically assumed that the acceleration a1 and sound significant parameter f1 belong to the same person. Therefore, a1 and f1 can be established as a recurring group of significant parameters belonging to the same person.

Therefore, during following operations of the system, it will be sufficient to detect only the parameter a1 or only the parameter f1 for knowing that the relative person habitually using the remote control is present in the environment.

Obviously, for having a sufficiently reliable identification, it will be necessary to confirm a pairing during following samplings. In other words, it will be necessary to reduce the margin of uncertainty on each recurring group. This can be done by only repeating the detections for a sufficient number of times in order to obtain a confirmation about the pairing in the same recurring group of parameters a1 and f1.

More generally, for this purpose, the pairing module 20 is configured to acquire the significant parameters for a plurality of sampling instants. At each sampling instant, the pairing module 20 generates a vector containing the detected significant parameters. In order to have a reliable identification, as said before, the pairing module 20 iteratively acquires the significant parameters and generates the associated vectors for a minimum number of sampling instants. In other words, it is necessary a number of samples sufficiently great for having a statistically reliable pairing.

Once the sampling is sufficient, the pairing module 20, for example by "machine learning" algorithms, is capable of finding the groups of recurring significant parameters and of associating each significant parameter of the group to a specific user. A possible logic can be the following. Once the sampling is sufficient, the pairing module 20 performs a size reduction (by means of a Principal Component Analysis, for example) for finding groups of significant parameters capable of explaining a satisfying percentage (comprised between 70% and 90% for example) of the variance of the measured values. Then, by means of non-supervised "machine learning" algorithms (such as for example the hierarchical clustering, DBSCAN or OPTICS algorithm), the vectors of significant parameters exhibiting similar patterns, are grouped inside of clusters and are continuously updated as new vectors of parameters are generated. Each cluster is associated to a different user which interacted with the device, or spoken in proximity of it.

It is also observed that the pairing module 20 can be, alternatively, included in the remote control 2, decoder 3 or remote system 4.

Referring again to FIG. 3, parallel to the pairing module 20, the system comprises a module 21 identifying the people present in the environment. Such people identifying module 21 receives, at the input, the significant parameters of the sound signal provided by the vocal acknowledging module 17 and is configured to determine the number of persons present in the environment and to distinguish among habitual persons and temporary persons. The temporary persons can, for example, be identified when a significant not-stored parameter is detected in a recurring group. Referring again to the example in FIG. 4, two persons are identifiable during each sampling period. The parameter f3, comparing during a single detecting period (t3), hypothetically will refer to a temporary person, while parameters f1 and f2 hypothetically will refer to habitual persons. The significant parameters of the sound signal of temporary persons can be neglected, or, alternatively, if the system identifies only the presence of temporary persons, will provide/suggest generic multimedia contents, in other words not having any relationship with specific users.

It is also observed that the module 21 for identifying people present in the environment can be also included in the remote control 2, in the decoder 3 or in the remote system 4.

According to a possible embodiment, the pairing module 20 receives, at the input, the significant parameters of the sound signal only of the habitual persons in order to neglect the temporary users. According to a further possible embodiment, moreover the pairing module 20 receives, at the input, significant parameters from the decoder 3. For example, the decoder 3 can transmit information identifying the program transmitted when one or more users are identified, as described, which then are associated to the preferred program. Such identifying information can include, for example, the type of program (movies, TV series, documentaries, etcetera), the genre (a drama, comedy, sentimental history, etcetera), the acting actors, etcetera. As an alternative, the decoder 3 can transmit the chronology of the user displays. In addition, the decoder 3 can provide information about the "clickstream", in other words about the sequence of the buttons pressed by the user, which identifies the zapping pattern and more generally the way the user interacts with the system.

Lastly, the user identification is transmitted to the decoder 3, which is consequently capable of suggesting contents adapted to the identified user.

In the present description and in the attached claims, it is observed that the system 1 and also the elements indicated by the term "module", can be implemented by hardware devices (central units, for example), by software or by a combination of hardware and software.

In order to satisfy particular contingent needs, the person skilled in the art can introduce several additions, modifications, or substitutions of elements with other operatively equivalent, to the described embodiments of the system for identifying a user among a plurality of users according to the invention, without falling out of the scope of the attached claims.

The invention claimed is:

1. System for acknowledging a user among a plurality of users in an environment, comprising:
   a movable device configured to be handled by said users in the environment, configured to command a stationary device for enjoying multimedia contents, wherein said movable device comprises:
   one or more motion sensors configured to detect movements imparted by the user to the movable device and to provide signals representative thereof;
   a microphone configured to detect the sound of the environment and to provide a signal representative thereof;
   a motion acknowledging module configured to receive at an input thereof, signals provided by the one or more motion sensors and to identify, in a plurality of subsequent detecting periods or instants, significant parameters of each of said one or more motion signals;
   a vocal acknowledging module, configured to receive at an input thereof, the signal provided by the microphone and to identify, in said plurality of subsequent detecting periods or instants, significant parameters of the sound in the environment;
   a pairing module configured to:
   iteratively receive at an input thereof, in each subsequent detecting period or instant for a plurality of sampling instants, both the significant parameters provided by the motion acknowledging module and by the vocal acknowledging module, and to generate at each sampling instant a vector containing the detected significant parameters for a statistically sufficient number of sampling instants;
   once the sampling is sufficient, identify, by a machine learning algorithm, groups of significant parameters which are recurringly correlated to each other in said vectors corresponding to said subsequent detecting periods or instants, wherein each group of significant parameters includes a combination of significant parameters provided both by the motion acknowledging module and by the vocal acknowledging module, the machine learning algorithm configured to:
   perform a size reduction for finding groups of significant parameters capable of explaining a satisfying percentage of the variance of the measured values;
   group the vectors of significant parameters exhibiting similar patterns inside of clusters and continuously update them as new vectors of parameters are generated; and
   associate each cluster to a specific user; and
   attribute each detected single significant parameter, provided either by the motion acknowledging module or by the vocal acknowledging module of the combination, of a common recurring group of significant parameters to a specific user.

2. System according to claim 1, comprising a memory module configured to store said recurring groups of significant parameters attributed to each user.

3. System according to claim 2, further comprising a gesture identifying module configured to receive at an input thereof the significant parameters determined by the motion acknowledging module, and a sound identifying module configured to receive at an input thereof the significant parameters determined by the sound acknowledging module, wherein each of said gesture identifying module and said sound identifying module is configured to:
   compare the significant parameters received at the input thereof with the significant parameters of the recurring groups stored in the memory module;
   attribute the significant parameters received at the input thereof to a specific user if there is a match between these and the significant parameters belonging to a specific recurring group of significant parameters corresponding to said user.

4. System according to claim 1, wherein said movable device further comprises one or more pressure sensors, suitable to detect pressures exerted by the user on the movable device, wherein the motion acknowledging module is further configured to receive at the input thereof the signals provided by the one or more pressure sensors and to identify significant parameters of said one or more pressure signals.

5. System according to claim 1, wherein said vocal acknowledging module is configured to eliminate from the signal representative of the sound in the environment, the sound portion due to the multimedia contents provided by the stationary device.

6. System according to claim 1, further comprising a people identifying module for identifying people present in the environment, configured to receive at an input thereof the significant parameters of the sound signal in the environment and to distinguish recurring people and temporary people in the environment, wherein temporary people are located upon detecting one or more significant parameters of the sound signal not belonging to any recurring group.

7. System according to claim 6, wherein the pairing module is configured to receive at an input thereof, in each subsequent detecting period or instant, the significant parameters of the sound in the environment, only of the recurring people.

8. System according to claim 7, wherein the pairing module is configured to receive at an input thereof, in each subsequent detecting period or instant, significant parameters from the stationary device, representative of the multimedia contents provided by the same.

9. System according to claim 1, further comprising said stationary device.

10. System according to claim 9, further comprising a remote processing system connected to said stationary device and/or to said movable device.

11. System according to claim 9, wherein said movable device and/or said stationary device and/or said remote processing system comprise said motion acknowledging and/or vocal acknowledging, and/or pairing, and/or memory, and/or gesture identifying, and/or sound identifying modules, and/or people present in the environment identifying modules.

12. System according to claim 9, wherein said movable device comprises a remote control and said stationary device comprises a decoder or a smart TV.

\* \* \* \* \*